United States Patent [19]

Martinez

[11] 4,152,810
[45] May 8, 1979

[54] AUTOMATICALLY INTERLOCKABLE HINGE

[75] Inventor: Ginez Martinez, Noisy le Sec, France
[73] Assignee: Salanon S.A., Romainville, France
[21] Appl. No.: 865,571
[22] Filed: Dec. 29, 1977

[30] Foreign Application Priority Data

Aug. 26, 1977 [FR] France ............................ 77 26116

[51] Int. Cl.$^2$ ............................................. E05D 11/10
[52] U.S. Cl. ........................................ 16/144; 182/24; 403/92
[58] Field of Search ................ 16/129, 133, 175, 144, 16/147, 148; 182/24, 163, 164; 403/92, 93, 95, 96

[56] References Cited

U.S. PATENT DOCUMENTS

| | | | |
|---|---|---|---|
| 3,655,012 | 4/1972 | Hoffman et al. | 182/163 |
| 3,955,240 | 5/1976 | Schuh et al. | 16/144 |

*Primary Examiner*—Werner H. Schroeder
*Assistant Examiner*—Moshe I. Cohen

*Attorney, Agent, or Firm*—Cushman, Darby & Cushman

[57] ABSTRACT

A lockable hinge for hingedly connecting structural members of a hinged assembly such as a folding ladder comprises two hinge parts which are pivotable with respect to a common hinge axis, a first hinge part being formed with a cylindrical protruding portion journalling in a cylindrical bore formed in the second hinge part. A locking member slidingly mounted on the first hinge part is controlled by a resiliently urged ear-shaped pivoting link adapted for selective stop-engagement with an actuating lever pivotingly mounted on said first hinge part. Pre-setting means, including a rotatable hinge cover which comprises releasing members adapted for cooperation with corresponding members attached to said actuating lever are provided for selectively disengaging said link from said stop-engagement with said actuating lever, whereby causing said locking member to move into a desired opening which is formed in said second hinge part and which opens in said bore so as to lock automatically the hinge in the pre-set angular position.

11 Claims, 8 Drawing Figures

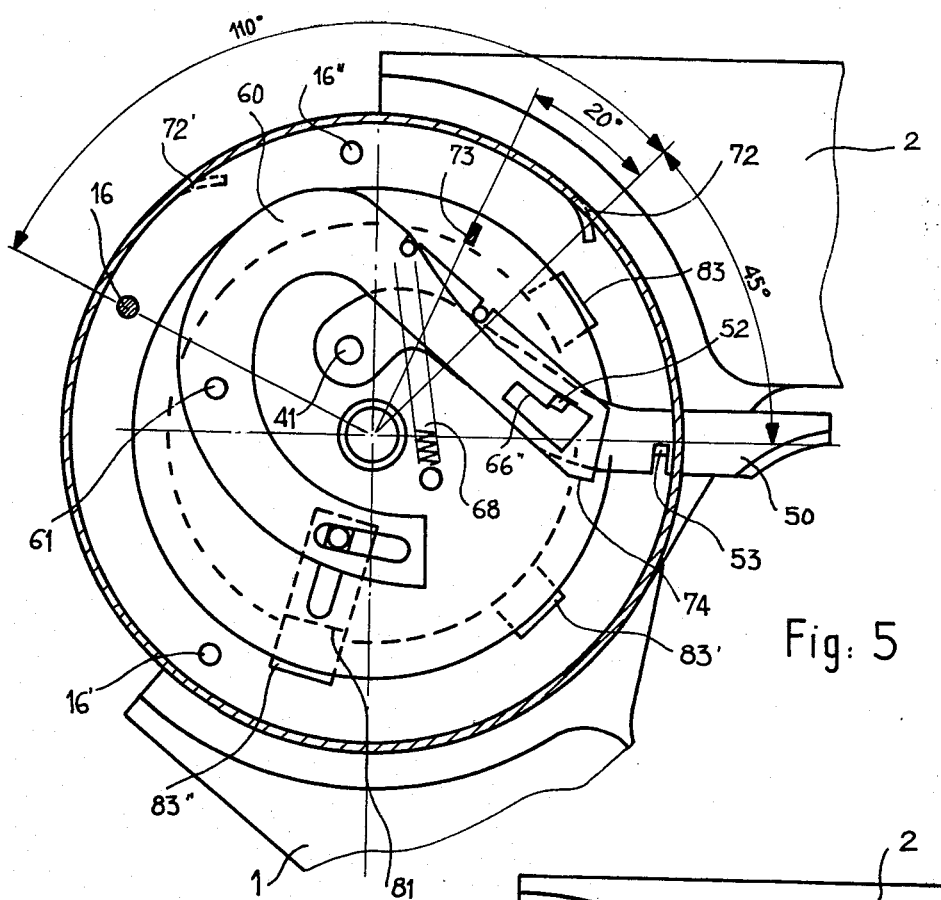
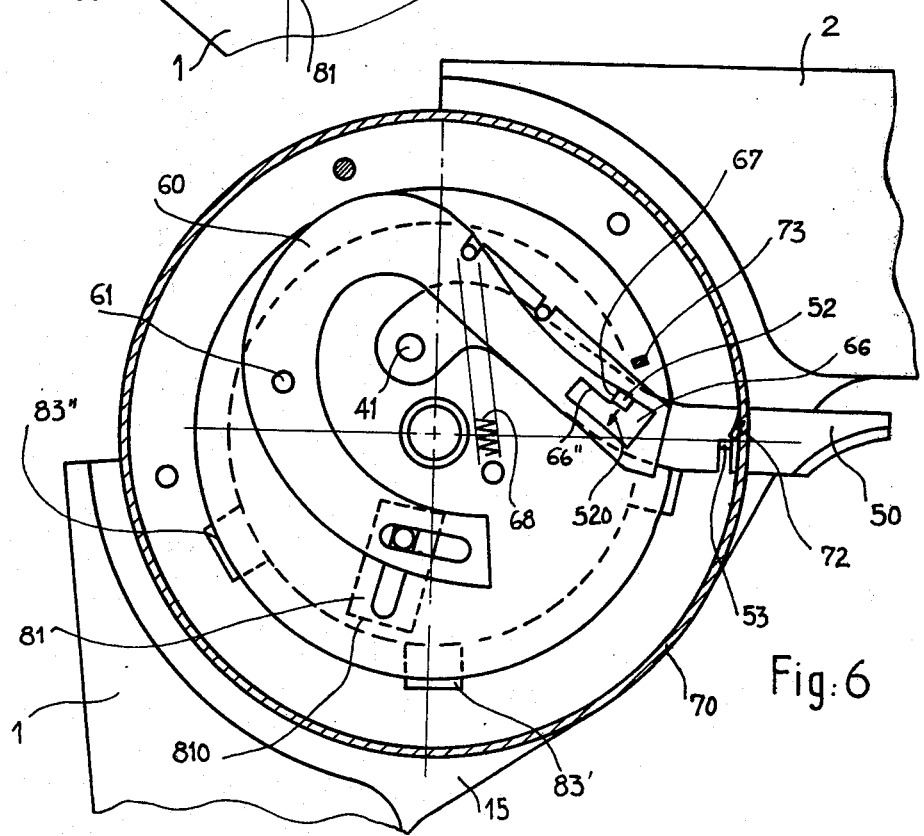

AUTOMATICALLY INTERLOCKABLE HINGE

BACKGROUND OF THE INVENTION

1. Field of the Invention

The present invention relates to a mechanical hinged connecting device, and more particularly to a hinge joint for connecting two members of a hinged structure and adapted to be selectively locked in different relative positions.

2. Description of the Prior Art

Various hinge devices of this type are already known which are commonly used for selectively locking in different relative positions coupled structure members, for instance of folding ladders, seats, pieces of furniture or the like.

Such hinge devices are generally comprised by two concentrically arranged plates mounted for relative pivoting motion around a hinge axis and comprising an unlockable selective locking mechanism for relatively securing the two plates, and accordingly the structure members connected thereto, in several predetermined angular positions.

The locking mechanisms in such hinge devices generally consist of a ratchet wheel cooperating with a releasable pawl device. Other known locking mechanisms embody a locking device of the spring-bolt type mounted on one of the plates for cooperation with notches or recesses forming bolt-clasps which are formed in the periphery of the other plate, said notches being arranged in angularly spaced relationship and distributed so as to correspond to the determined locking positions of the hinge.

Such locking devices of the spring-bolt type can be moved relatively to the first supporting plate in a generally radially extending direction with respect to the hinge axis upon actuation by a release lever means which is hingedly mounted on said first plate for pushing the spring-bolt locking member towards its unlocked position against the biasing force of a return spring, additional locking devices being eventually provided on the second plate for latching the actuating lever in an unlocked position of the hinge.

Said actuating levers or handles present many drawbacks. Since they have to be designed so as to actuate the locking member against the biasing force of a strong return spring, they are generally of a large construction, whereby they contribute to increase the total weight of the hinge. Moreover, since the biasing force of the return spring is directly exerted upon said lever, the angular maneuvering range of the protruding or handling portion of said lever results in problems of accessibility and transmission of actuating forces and also in risks for the user to have his fingers or his palm become hinged between said handle and the adjacent structure member of the hinge. Additionally, the locking device for locking such levers has also to be broadly dimensioned and do not permit the smooth operation of the mechanism.

OBJECTS OF THE INVENTION

There is a an object of the present invention to obviate such drawbacks by providing a lockable hinge of a compact and light construction, embodying a locking mechanism which is efficient but also of a great simplicity and easy to operate.

Owing to the easy or smooth operation of such a mechanism, it is possible, according to another object of the invention, to provide such a hinge with a pre-setting device for pre-setting predetermined angular positions for the hinged structure, the locking mechanism being automatically unlatched when the hinge reaches the predetermined angular position, either in closing or in opening the hinge.

There is another object of the invention to provide a locking mechanism for such a hinge which is easy to operate, which has a limited clearance, which only necessitates weak actuation forces and which does not present risks of fluttering of the handling end of the actuating handle.

There is another object of the invention to realize such a hinge with a minimum of movable members, whereby reducing considerably the manufacturing and mounting costs.

BRIEF DESCRIPTION OF THE DRAWINGS

Further characteristics and advantages of the present invention will become apparent from the following description of a preferred but not restrictive embodiment, made in relation with the accompanying drawings, in which:

FIG. 5 shows the hinge in a closed position ready to be open towards a position at a greater angle;

FIG. 6 shows the hinge displaced from its position shown on FIG. 5 to a locked position at a greater angle.

DETAILED DESCRIPTION OF THE DRAWINGS

Figure 1:
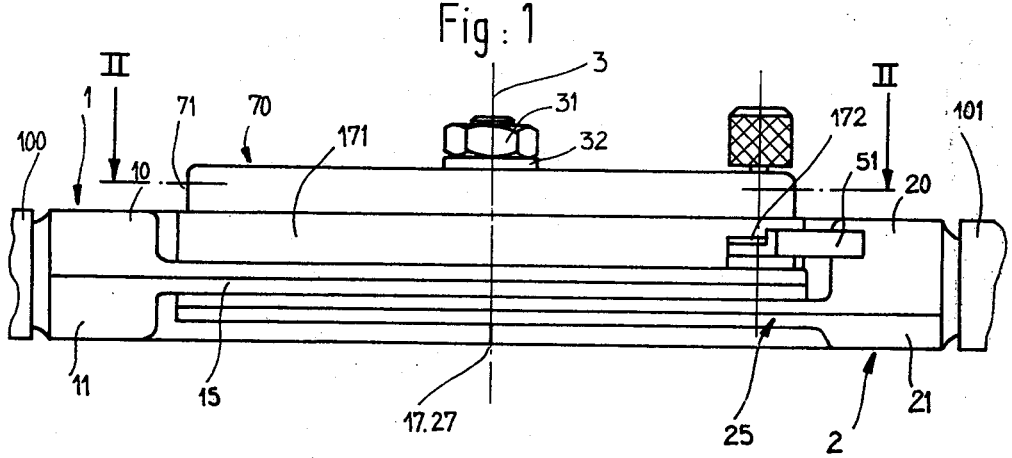
FIG. 1 is a side view of the hinge according to the invention.
Figure 2:
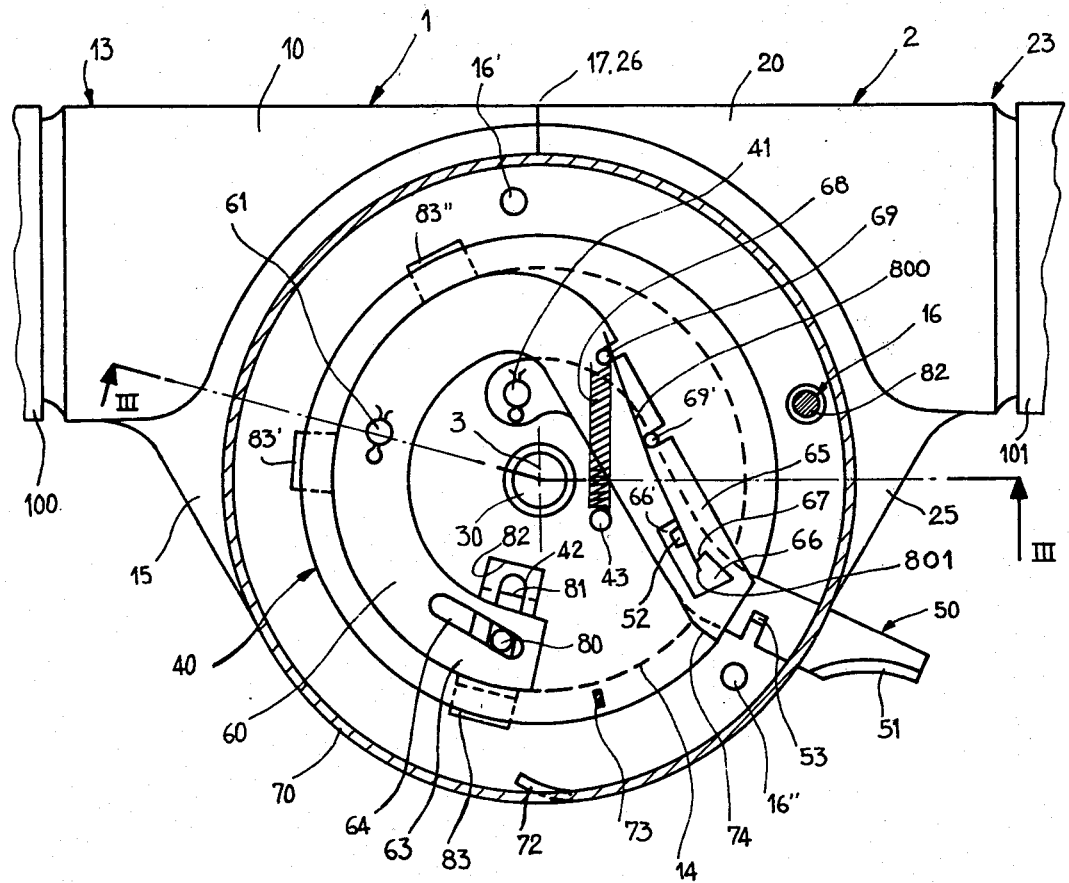
FIG. 2 is a top plan view, partially in cross-section along line 2—2 of FIG. 1, of the hinge of FIG. 1.
Figure 3:
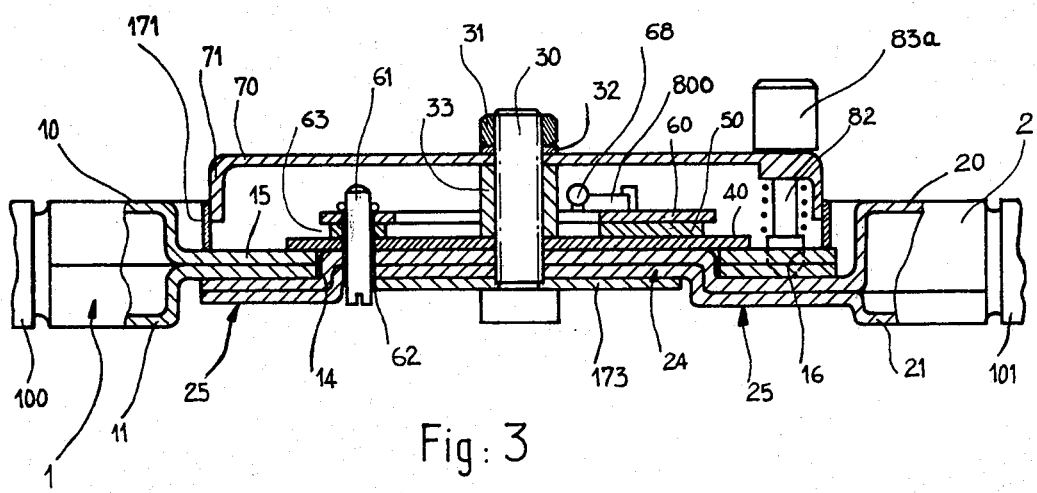
FIG. 3 is a view similar to FIG. 1, but in cross-section along line 3—3 of FIG. 2.

As shown in FIGS. 1 to 3, the hinge according to the invention essentially comprises two hinge parts, generally designated by reference numerals 1 and 2, which are mounted for relative rotation around a common hinge axis, generally designated by reference 3. Each hinge part is comprised of two half-shells 10, 11 and 20, 21, respectively, which form connecting portions, generally designated by references 13 and 23, for receiving, for instance by fitting or netting, uprights 100, 101 of a folding ladder or any kind of structure members to be assembled by means of a lockable hinge joint.

Half-shells 10 and 11 are pressed and locally joined to form a double plate 15 which presents a partially circular outer contour and which is formed with a bore 14 in alignment with the hinge axis 3. In a similar manner, half-shells 20 and 21 are pressed and locally joined to form a stepped double plate 25 formed with a central portion 24 projecting from the general plane of the double plate 25 and having a circular contour determined so as to be received for rotation within the bore 14 in the double plate 15 formed by the two half-shells 10 and 11 (FIG. 3). The two hinge parts 1 and 2 are thus mounted for relative rotation in sliding contact between peripheral annular portions of double plates 15 and 25, the upper surface of the protruding portion 24 of hinge part 2 extending substantially in the plane of the upper surface of the double plate 15 formed by the half-shell 10 of the first hinge part 1.

In said common plane is disposed a substantially circular holding plate 40 having a diameter greater than the bore 14. Said holding plate 40 supports a hinge actuating lever 50 which is mounted for pivoting motion around an axis which consists for example in a pin 41 fitted within the protruding portion 24 of the hinge part 2. On said actuating lever 50, and cooperating therewith, is disposed a locking brace or link 60 which is in turn mounted for pivoting motion around an axis, consisting for example in a pin 61 fitted within a bore 62 of the protruding portion 24 of the hinge part 2. A spacer ring 63 compensates, at the level of the pin 61, for the thickness of the actuating or control lever 50.

Said assembly is overlaid by a flanged cover 70 having flanged edges 71 which form a cylindrical flange for cooperation with a sealing cylindrical flange 171 connected to the double plate 15 of the hinge part 1. The cover is mounted for rotation about the axis 3 of the hinge, said axis consisting of an assembling bolt 30 mounted through the protruding portion 24 of the double plate 25, the holding plate 40 and the cover 70, this set of components being assembled in position by a nut 31, a washer 32 being arranged between the nut 31 and the cover 70, a cylindrical spacer 33, acting as a supporting bearing structure for the cover 70, being arranged between said cover and the holding plate 40. An opening 172 is formed in the wall of the flange 171 for the passage of the handling end 51 of the actuating lever 50. A sealing plate 173 is interposed between the head of bolt 30 and the bottom of the protruding portion 24 of the hinge part 2.

As shown on FIGS. 1 and 2, the hinge parts 1 and 2 are formed with front faces 17, 27, respectively, which come in abutting contact when the hinge is in its open angular position corresponding to an opening angle of 180° (i.e. in the position shown on FIGS. 1 to 4) when the ladder uprights 100 and 101 are perfectly aligned with each other.

The locking link 60 has a shape of an ear, with a curved end portion 63 and a straight end portion as leg 65. The pin or pivoting axis 61 around which the link 60 is adapted for rotation is located partially at the middle part of the curved portion, the end of said curved portion being formed with an elongated opening 64, when the straight portion 65 is formed with an opening 66 defining a shoulder 67 for purposes which will be explained hereinbelow. The elongated opening 64 receives a key actuating rod 80 of a plate key 81 which is slidingly received within a rectangular recess 82 formed in the protruding portion 24 of the double plate 25 of hinge part 2. The key rod 80 extends through a second elongated opening 41 which is formed in the holding plate 40 and which extends radially in the recess 82 within the protruding portion 24. Angularly spaced rectangular openings 83, 83', 83'' are formed in the double plate 15 of the hinge part 1 at angles corresponding to the desired predetermined opening angles of the hinge and open in the bore 14 so as to come in meeting alignment, according to the respective configurations of the hinge, with the recess 82 within the protruding portion 24, so as to constitute with said recess, by means of the plate key 81, a lock which prevents the hinge parts 1 and 2 from relative rotation with respect to each other.

The locking link 60 is biased so as to rotate in the clockwise direction (as shown on the figures), i.e., in the direction for radially outwardly moving the plate key 81, by a traction spring 68 tensioned between a peg 69 affixed to leg 65 of the link 60 and a peg 43 affixed to the holding plate 40, the angular travel of said link 60 being limited in said clockwise direction by the key rod 81 which comes in abutment against the outer end of the elongated opening 64. Cooperation between the actuating lever 50 and the locking link 60 is caused by a tab 52 affixed to the lever 50, said tab being formed for example by cutting and folding, said tab 58 protruding from the general plane of the lever 50 and extending through the opening 66 within the link 60. A leaf spring 800 extends along the upper surface of the leg 65 of the link 60 and is held between the peg 69 and a second peg 69', also affixed to the leg 65, the free end 801 of the leaf spring 800 further cooperating with the tab 52 of the actuating lever 50.

The hinge according to the present invention is provided with a locking pre-setting, either for an opening phase or for a closing phase of the hinge. Therefore, use is made of the cover 70 which is pivotingly mounted on the axis or bolt 30 independently from the two hinge parts. The pre-setting means comprises a setting finger 82 which is slidingly mounted within the front or upper wall of the cover 70 and which is actuable from the outside by a user against the biasing force of a return spring by means of a control head 83a, the opposite or lower end of the finger 82 being urged, by the return spring, against the double plate 15 of the hinge part 1 so as to engage holes 16, 16' and 16'' formed in said double plate 15, said holes being angularly spaced so as to correspond, in the embodiment shown, to the three setting positions for selectively locking the hinge in the three different angular positions. Said pre-setting means further comprises a first tab 72, integral with the cover 70 and extending inwardly from the flange 71, said tab being formed for example by punching the flange wall, for cooperation with a tab 53 formed as the tab 52 on the lever 50. That pre-setting means also comprises a resilient tab 73 attached to the cover 70 and formed, for instance, by punching said cover, said tab 73 extending inwardly from the front wall of the cover for selectively cooperating with a corresponding stop face 74 which is formed at the end of the outer leg 65 of the link 60.

The opening and closing sequences of the articulation with a pre-setting of the locking angular position of the hinge will be now detailed.

Generally speaking, the hinge of the invention is automatically locked in a desired relative angular position through displacement of the key 81 which is slidingly received within the protruding portion 24 of the hinge part 2, the outer radially extending end of the key being received within one of the predetermined pre-setting openings 83, 83' or 83'' (in the case of an embodiment having three predetermined angular positions) under the biasing force of the return tension spring 68 of the locking link 60. Such a locking position is shown in FIG. 2 at an opening angle of 180°, i.e. with the recess 82 within the hinge part 2 in meeting alignment with the opening 83 within the hinge part 1, said two hinge parts being associated and prevented from relative rotation by the key 81 which is radially outwardly moved beyond the radius corresponding to the journalling bore 14. In said locked position, the tab 52 of the lever 50 is in the inner part 66' of the opening 66, i.e. beyond the hooking shoulder 67, in abutment against the edge 66'' of said inner part of the opening 66.

Figure 4:
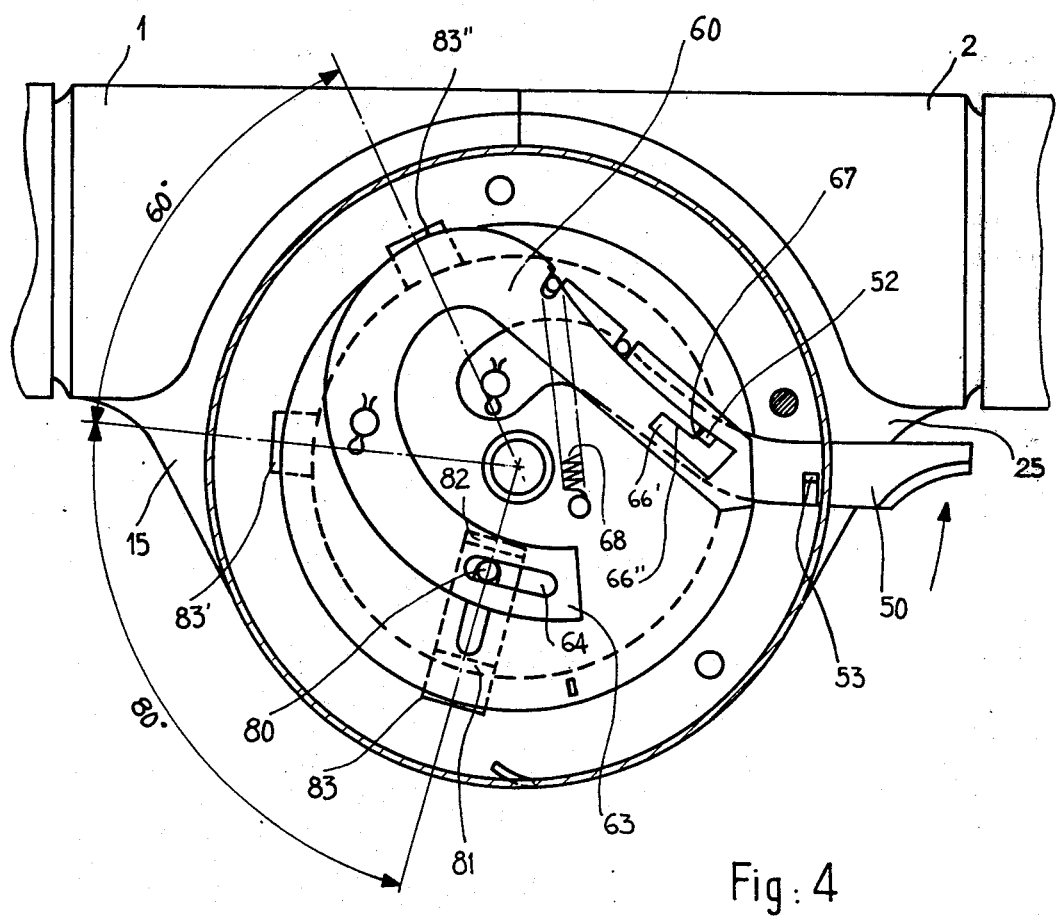
FIG. 4 is a view similar to FIG. 2, but with the locking device latched in unlocked position.

Comparatively, the FIG. 4 shows the respective positions of the actuating and locking members of the hinge which have been moved from their position shown on FIG. 2 so as to unlock the hinge. In the position shown on FIG. 4, the actuating lever 50 has been moved in the counterclockwise direction by manual action on its handling end 51 (as illustrated by the arrow). Said movement in the counterclockwise direction has made the tab 52 slide against the edge 66″ of the opening part 66′ in the outer leg 65 of the link 60 against the biasing force of the spring 68 till said tab 52 comes into locking position against the shoulder 67, said locking position being stable owing to the angle of the shoulder 67, (lower than 90° with respect to the edge 66″), the force exerted by the spring 68 and the relative arrangement of the pivoting axes 41 and 61 of the lever 50 and of the link 60, respectively. The thrust transmitted by the tab 52 to the edge of the opening 66 has provoked a rotation of the link 60 in the counterclockwise direction (as shown on the drawings), whereby resulting, through the cooperation between the edges of the elongated opening 64 and the key rod 80, in a releasing displacement of the key 81 radially inwardly in the recess 82, whereby said key is disengaged from the opening 83 and accordingly unlocks the two hinge parts allowing same to relatively rotate so that a different determined angular position can be reached.

There is shown in FIGS. 5 and 6 a sequence of opening of the hinge between an initial semi-closed angular position corresponding to a folding angle of 40° and a second wider angular position corresponding to an angle of 100°, FIG. 5 showing the hinge in its position at 40° as it has just been unlocked, (corresponding to the unlocked position of FIG. 4), FIG. 6 showing the hinge in a position ready to be locked just before reaching the angular position corresponding to an opening angle of 100°. In the embodiment shown, the respective angular positions for selectively locking the hinge are 40, 100 and 180°, the locking openings 83, 83′, 83″ within the hinge part 1 being accordingly three in number, and angularly spaced so as to form therebetween angles of 80° and 60°, respectively, as shown in FIG. 4.

In the position shown in FIG. 5, the actuating lever 50 is latched in the position where the key 81 is disengaged from the opening 83″ corresponding to an angular locking position of the hinge of 40°. Previously, the cover has been turned so as to allow the setting finger 82 to be positioned within the hole 16 corresponding to the pre-setting position for an angular opening of the hinge of 100°. In said position, the tab 72 has been turned in a counterclockwise direction beyond the corresponding tab 53 of the actuating lever 50, i.e. in the position shown in FIG. 5 at an angle of 45° from the radially extending direction passing through the corresponding tab 53 of the lever 50. The center angle between the tab 72 and the setting hole 16 for a hinge opening of 100° is 110°. In FIG. 5 there is also shown in dotted lines the position 72′ of the tab 72 corresponding to a registration or a pre-setting position for a hinge opening of 180°, the corresponding setting hole then receiving the finger 82 being the hole 16′.

One can see that in the position shown on FIG. 5, where the hinge is unlocked for relative rotation in the opening or clockwise direction of the hinge part 1 with respect to hinge part 2 which is supposed to be held stationary, the relative position of the lever 50 and of the link 60 remains unchanged till the hinge part 1 reaches the angular position shown on FIG. 6, i.e. immediately before the desired opening of the hinge at an angular position of 100° where the tab 72 comes into cooperative engagement with the corresponding tab 53 of the lever 50. By further rotating the hinge part 1, the tab 72 of the cover 70 will move the tab 53, e.g. the lever 50 in the clockwise direction, whereby disengaging the latching tab 52 from the shoulder 67 formed in the opening 66 in the direction of the arrow 520; accordingly, under the biasing force of the spring 68, the link 60 will rotate in the clockwise direction whereby causing the tab 52 to move along the edge 66″ of the opening 66 while driving the lever 50 in the clockwise direction and disengaging the tab 53 from the tab 62 of the cover. The link 60 being thus unlatched, the key 81 is radially outwardly biased so that a portion of its front edge 810 comes in abutting engagement against the wall of the bore 14, a further slight rotation of the hinge part 1 in the clockwise direction causing said key 81 to enter the opening 83′ in the hinge part 1, i.e. the opening corresponding to the locking of the hinge in an angular position of 100°, the actuating and locking members recovering their locking position shown on FIG. 2. It will be understood that, in order to open the hinge at an angular opening of 180°, such as shown on FIG. 2, the pre-setting will be obtained by rotating the cover so as to position the finger 82 in the opening 16′, the unlocking sequence of the actuating lever and of the locking link comprising the same steps as in the above.

Figure 7:
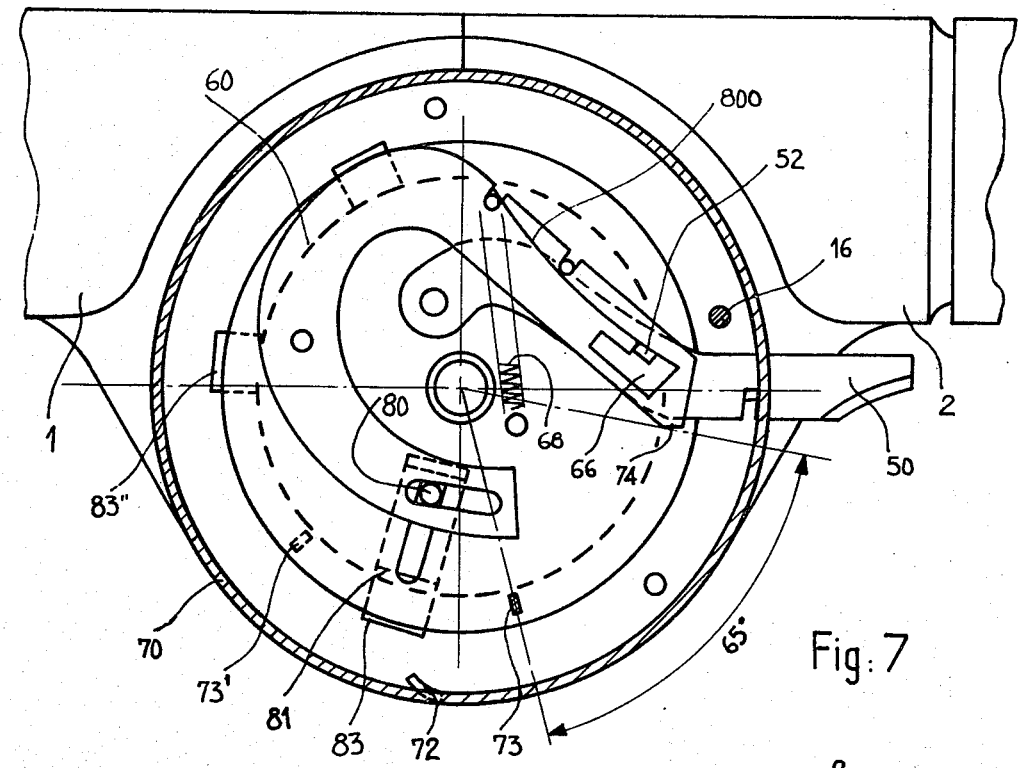
FIGS. 7 and 8 show successive steps of the closing of the hinge angle similar to the opening steps of FIGS. 5 and 6.
Figure 8:
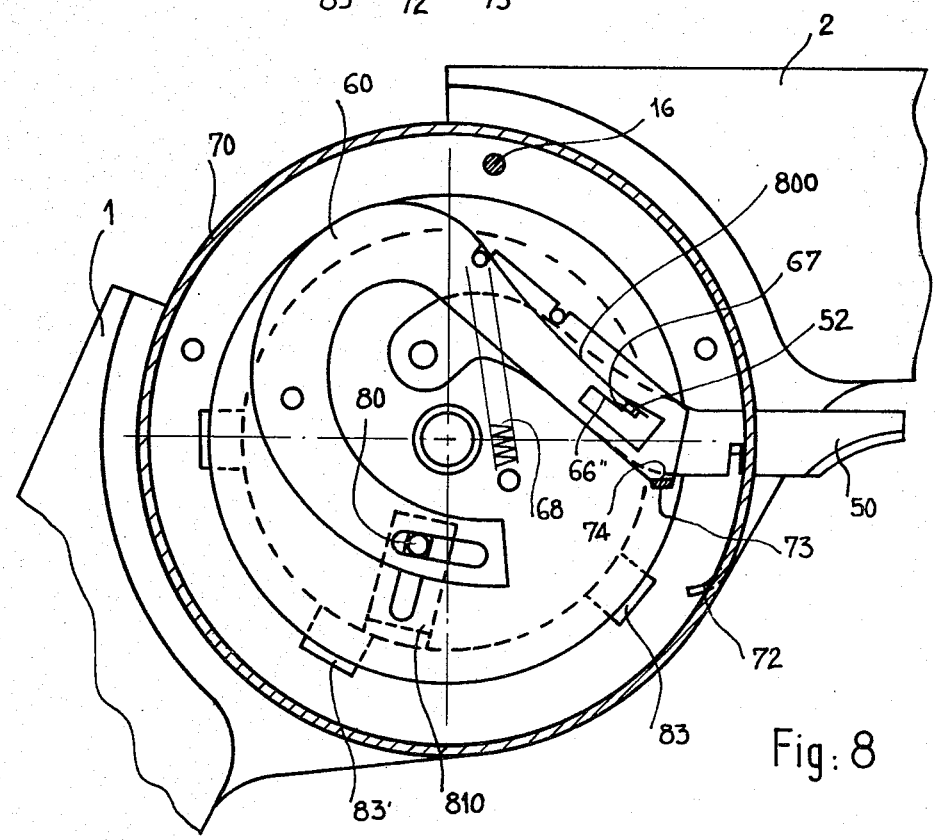

There is shown in FIGS. 7 and 8 a sequence of closing or folding of the hinge from an initial angular position of 180° (FIG. 7) to an angular position of 110°, FIG. 8 showing the position of the hinge immediately before reaching said angular position of 110°. As in the opening sequence, the pre-setting at 110° will be obtained by making the cover 70 rotate so as to cause the finger 82 to engage the setting hole 16 corresponding to a hinge opening of 110° as in FIG. 5. The actuating lever 50 has been pivoted in the counterclockwise direction to its latched unlocking position similar to its position shown in FIG. 5, i.e. with the tab 52 being latched against the shoulder 67 of the opening 66 of the locking link 60, the key 81 being in said position removed from the opening 83 which corresponds to a locked position of 180° for the hinge, i.e. in the configuration identical to FIG. 4. The releasing setting means are comprised, for a closing sequence, by a resilient tab 73 which is located, in the pre-setting configuration of 110° shown on the figure, in a position at an angle of 65° with respect to the radially extending direction passing by the stop edge 74 at the end of the leg 65 of the link 60, the angle between said tab 73 and the pre-setting hole 16 being 90°. In FIG. 7 there is also shown in dotted lines the position of the tab 73 for a pre-setting registration corresponding to a locked angular position of 40° for the hinge.

When initiating a displacement for closing the angle of the hinge by rotating the hinge part 1 (the hinge part 2 being supposed stationary), the cover 70 is caused to rotate together with the hinge part 1 through the setting finger 82, the actuating and locking members of the hinge remaining in an unchanged position till the moment where the tab 73 comes into cooperative abutment with the corresponding stop edge 74 of the link 60 (FIG. 8). A further rotation in the counterclockwise direction of the hinge part 1 causes the tab 73, which is in abutment against the edge 74, to rotate the link 60 in the counterclockwise direction, whereby disengaging, under the action of the leaf spring 80, the tab 52 of the lever 50 from the shoulder 67 and bringing same in front of the edge 66". Through a further rotation of the hinge part 1, the spring 68, which urges the link 60 in the clockwise direction, becomes prevailing over the driving force of the tab 73 while being momentarily reinforced by the leaf spring 80. The resilient tab 73 then elastically retracts, whereby allowing the spring 68 to cause the link 60 to rotate in the clockwise direction so as to bring, as previously disclosed in relation with FIG. 6, the front edge 810 of the key 81 in abutting contact against the wall of the bore 14 preliminary to the penetration of said key into the opening 83" when the hinge positively reaches the angular position of 110° so as to lock said hinge in said angular position which were previously set by means of the finger 82 on the cover 60 resiliently received within the corresponding pre-setting hole 16.

All the components of the hinge according to the invention can be manufactured from stamping, but several components, such as the cover and the sealing flange can be made of a molded thermoplastic material.

While the invention has been disclosed in relation with a preferred embodiment, more particularly directed to a hinge joint for a folding ladder, it will be understood that further adaptations and modifications are possible without departing from the spirit and scope of the invention, as defined by the appended claims. More particularly, the number of the angular locked positions for the hinge is not limited to three, but can be greater or lesser in number. Moreover, such a hinge can be used in any kind of articulated hinge structures where it is required to lock or latch movable components in predetermined angular positions, for instance in furniture pieces or in mechanical display structures, the connecting ends of the hinge parts being adapted accordingly.

What I claim is:

1. A lockable hinge adapted for being selectively locked in several predetermined angular positions, comprising : two hinge parts having ends adapted for connection to structural components of a hinged assembly, said hinge parts being mounted for relative rotation around a common hinge axis with sliding contact between two plates formed in said hinge parts and having a partially circular contour, a first of said plates being formed with a plurality of first angularly spaced openings for receiving a locking member which is slidably mounted in the second of said plates; actuable and lockable mechanical control means comprising a return resilient member being provided for controlling the displacement of said locking member between a first locking position for the hinge and a second unlocking position allowing said two hinge parts to relatively rotate, wherein said second plate is formed with a cylindrical protruding portion journaled within a bore formed in said second plate, said locking member being mounted for sliding motion within a radially directed second opening which is formed within said protruding portion of said second plate, said first openings formed within said first plate extending radially so as to open within said bore, said mechanical control means comprising an actuating lever pivotedly mounted on said protruding portion of said second plate for cooperation with a locking link having two ends and which is also pivotedly mounted on said protruding portion of said second plate and which is hingedly connected by one of said ends to said locking member so as to control the sliding movement thereof between said two positions, said actuating lever comprising a protruding portion adapted for cooperation with a stop member formed at the other of said ends of said link opposite to said first end with respect to the pivoting axis of said link on one hand for controlling said displacement of said link against the biasing force of a return spring tensioned between said first end of said link and said protruding portion of said second plate, and on the other hand for latching said lever and said link in a latched position of relative positive engagement corresponding to said unlocked position of said locking member, means being provided for automatically releasing said lever and said link from said latched position.

2. A hinge according to claim 1, wherein said releasing means comprises means for selectively pre-setting a predetermined locked position for the hinge, adapted for unlatching said mechanical control means when said two hinge parts come in a relative position adjacent the selected angular locked position, so as to lock said hinge in said angular position.

3. A hinge according to claim 2, comprising a cylindrical cover having a front wall and a lateral wall, said cover overlying said mechanical control means and being mounted for selective relative rotation with respect to said two hinge parts on said protruding portion of said second plate.

4. A hinge according to claim 3, wherein said pre-setting means comprises a finger which is slidingly mounted on said front wall of said cover and which is adapted for cooperation by one end thereof with angularly spaced openings formed on an annular portion of said first plate surrounding said protruding portion of said second plate, and first and second protruding unlatching members extending inwardly from the cover for selectively unlatching said mechanical control means through relative rotation in either clockwise or counterclockwise direction of said cover which has been caused to rotate together with said first plate by said pre-setting finger received within one of said angularly spaced openings.

5. A hinge according to claim 4, wherein said first unlatching member for an opening sequence of said hinge is comprised of a tab extending inwardly form said lateral wall of said cylindrical cover and adapted for cooperation with a protruding member extending from said actuating lever for disengaging same from said stop member of said link and for releasing said link and leaving same to be moved under the biasing force of said return spring so as to cause said locking member to be radially outwardly moved in said protruding portion of said second plate.

6. A hinge according to claim 5, wherein said second unlatching member for a closing sequence of said hinge is comprised of a resilient tab connected to said front wall of said cylindrical cover and extending inwardly therefrom, said tab being adapted for driving cooperation with a stop portion of said actuating lever for disengaging said protruding portion of said actuating member from said stop member of said link and causing same to rotate under the biasing force of said return spring for radially outwardly moving said locking member, the driving elastical force of said resilient tab in cooperation with said stop portion being lower than said biasing force of said return spring but reinforced in a first step by a second spring mounted on said link for cooperation with said protruding portion of said lever so as to urge same in the direction for disengaging said protruding portion from said stop member of said link.

7. A hinge according to claim 6, wherein said stop member of said link consists of a shaped opening within which extends said protruding portion of said lever and which is formed with a substantially radially extending first contacting face, said first face being elongated in the radial direction by a second face which is offset from said first face in the angular direction opposite said biasing force of said return spring, the junction between said two faces forming a shoulder extending from said second face at an angle lower than 90° so as to realize a locking recess for said protruding portion of said lever which is biased by said return spring whereby resulting in a releasable and stable stop connection between said lever and said link.

8. A hinge according to claim 7, wherein said sliding locking member is comprised of a platen key of a substantially rectangular shape, a circular holding plate being disposed in overlaying relationship on said protruding portion of said second plate, said holding plate having a diameter slightly greater than the diameter of said bore within said first plate, said platen key being provided with a key rod extending substantially perpendicularly to said key through a radially extending elongated opening formed in said holding plate and through a second opening extending substantially normally to said first opening in a plane parallel and formed in said first end of said link.

9. A hinge according to claim 8, wherein said cover is adapted for rotation in smooth friction contact by the outer periphery of its said lateral wall with a sealing cylindrical flange mounted on said first plate, said flange being formed with an opening permitting the passage and the angular deflexion of a handling portion of said actuating lever extending substantially radially outwardly from said plates.

10. A hinge according to claim 9, wherein said link has substantially the form of an ear, the link portion adjacent to said first end of the link being substantially circular and the link portion adjacent said second end being substantially straight, the pivoting axis of said actuating lever being located within the half inner space defined by said ear shaped link in the vicinity of said straight portion of said link.

11. A hinge according to claim 9, wherein said first and second unlatching members are integral with said cover and formed by stamping and folding.

* * * * *